Dec. 13, 1932.  H. E. STAHL, SR  1,891,068
COMPASS
Filed July 5, 1929   2 Sheets-Sheet 1
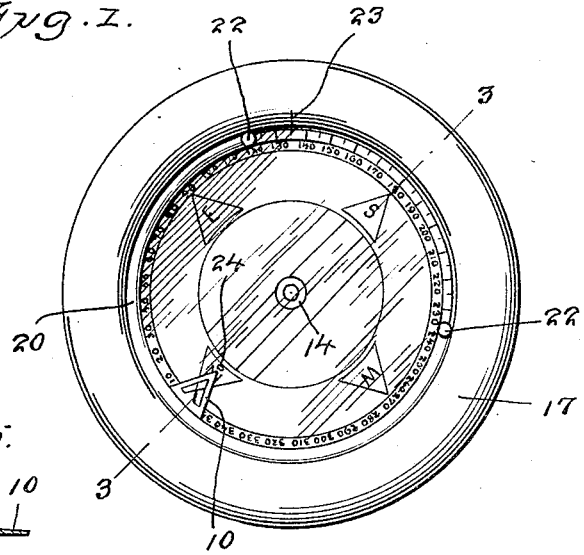
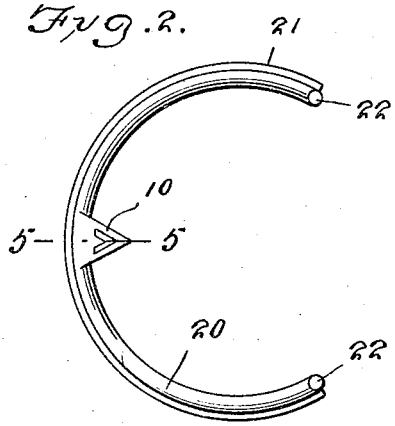
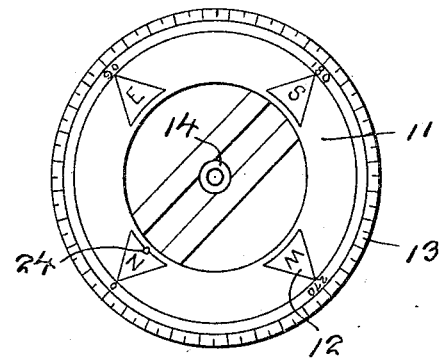
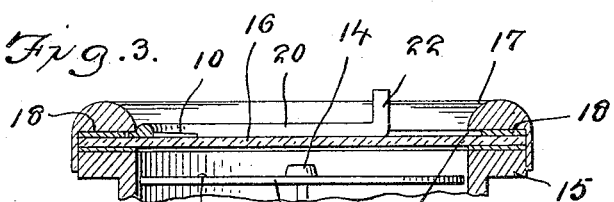
INVENTOR.
Harry E. Stahl, Sr.,
BY Victor J. Evans
ATTORNEY.

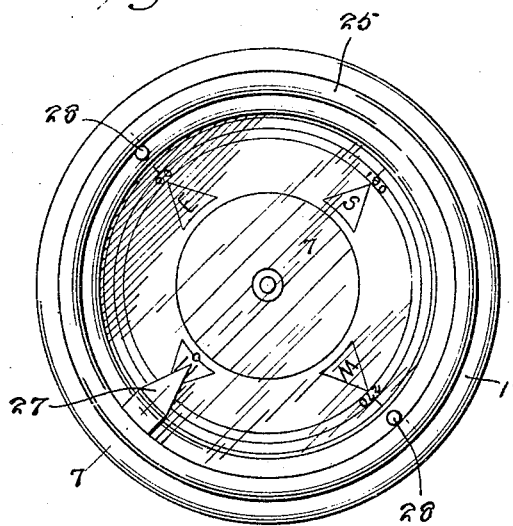
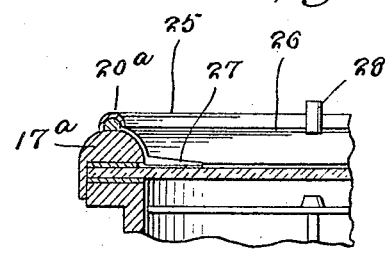
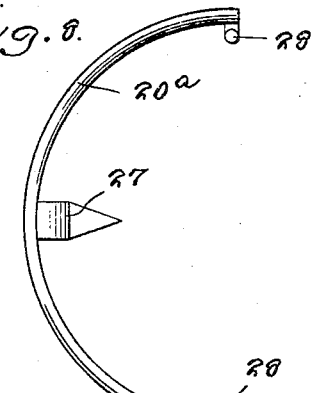
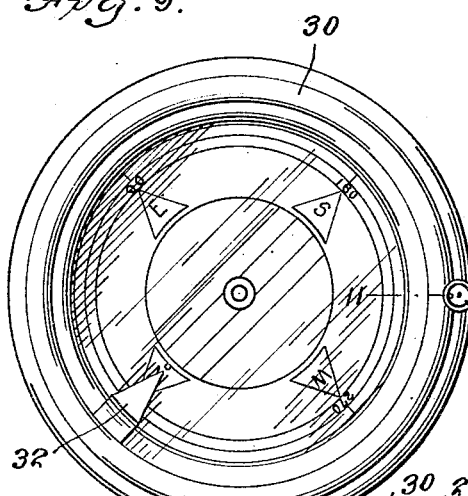
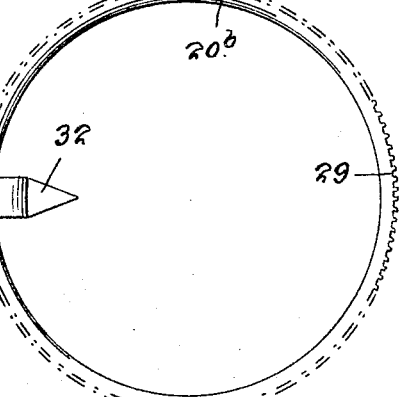
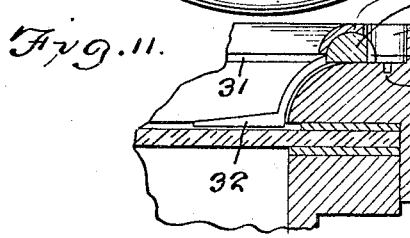

Patented Dec. 13, 1932

1,891,068

UNITED STATES PATENT OFFICE

HARRY E. STAHL, SR., OF TRENTON, NEW JERSEY

COMPASS

Application filed July 5, 1929. Serial No. 376,148.

This invention relates to compasses and has particular relation to ships' compasses, an object being to provide means which may be adjustably positioned with respect to the compass card to indicate a given course.

Another object of the invention is to provide a device which may be attached to or form a part of a compass whereby, when the course is set, the device may be adjusted with respect to a given point upon the compass card, so that the helmsman may hold the course indicated by the device without recourse to the lubber line of the compass.

With the above and other objects in view, the invention further includes the following novel features and details of construction, to be hereinafter more fully described, illustrated in the accompanying drawings and pointed out in the appended claims.

In the drawings:—

Figure 1 is a plan view of a compass with the invention applied.

Figure 2 is a plan view of the course indicator per se.

Figure 3 is a section on the line 3—3 of Figure 1.

Figure 4 is a plan view of the compass card.

Figure 5 is an enlarged sectional view on the line 5—5 of Figure 2.

Figure 6 is a plan view of a compass illustrating a different form of the invention.

Figure 7 is an enlarged fragmentary sectional view on the line 7—7 of Figure 6.

Figure 8 is a plan view of the course indicator shown in Figures 6 and 7.

Figure 9 is a plan view of the compass showing a still further form of the invention.

Figure 10 is a detail plan view of the course indicator used in connection with the compass shown in Figure 9.

Figure 11 is an enlarged sectional view on the line 11—11 of Figure 9.

Figure 12 is a detail view of the key used in the form of the invention shown in Figures 9, 10 and 11.

In the use of a ship's compass, the course is set by the navigator or other qualified ship's officer and the helmsman steers the course by means of the lubber line of the compass. This method has many disadvantages, among which is the position of the lubber line, rendering it difficult to see the line especially when facing the sun. Again, the course may be given to the helmsman in degrees, so that it is possible for the helmsman to become confused and forget the course, so that he may steer the ship out of proper reckoning before his error is discovered.

The present invention overcomes these and many other disadvantages by providing means whereby it will be unnecessary to remember the given course or to consult the lubber line.

To this end, the invention includes a pointer or indicator 10 which is adjustable circumferentially of the compass card 11. This card as is usual is magnetically controlled and contains the cardinal points 12 and degrees 13. The compass card is suitably mounted as indicated at 14 and is contained within a housing 15. The housing is closed by a lens 16 which is held in place by an annulus 17, a suitable gasket 18 being interposed between this annulus and the lens 16 so that an annular circumferential groove 19 is provided.

This groove 19 is utilized for mounting a pointer or indicator 10 and for this purpose, the pointer or indicator extends radially inward from a curved, preferably resilient member 20 which is provided with an outwardly disposed circumferential rib 21. This rib enters and is movable in the groove 19, so that the pointer or indicator 10 may be moved circumferentially of the compass card 11. The ends of the member 20 carry upwardly extending finger pieces 22 for convenience in adjusting the pointer or indicator.

In the use of the invention, the course to be steered is set, which as shown in Figure 1 is one hundred and thirty-five degrees as indicated by the lubber line 23. The pointer or indicator 10 is then positioned with respect to one of the points of the compass, which may be the nearest large division. It is preferred however to provide a luminous point 24 upon the compass card and to make the pointer or indicator also luminous and to set the pointer or indicator so as to indicate the luminous point 24. It will be apparent that as long as the indicator 10 and point 24 maintain their proper relation, one hundred and thirty-five degrees will be in register with the lubber line 23, so that it is only necessary for the helmsman to keep the pointer 10 and luminous point 24 in proper registration to follow the correct indicated course.

It will be apparent from the foregoing description and accompanying drawings that the invention is especially adapted for use upon private yachts and boats carrying inexperienced crews.

In Figures 6, 7 and 8, the carrier 20a is housed within a transversely curved flange 25 which extends circumferentially around the top of the annulus 17a. The flange 25 is spaced from the annulus so as to provide a circumferential groove 26 through which the pointer or indicator 27 may extend. Finger pieces 28 extend radially inward through the groove 26 and upward so as to provide for convenience of adjustment.

In Figures 9, 10 and 11, the carrier 20b is in the form of a ring whose outer edge is toothed as shown at 29. This ring is guided in a transversely curved guide flange 30 after the manner of the flange 25 and is arranged to provide a groove 31. This groove accommodates the pointer or indicator 32 so that the latter may be adjusted with respect to the luminous mark or point 25.

The flange 30 is provided with an opening or socket 33 having a recess 34 located concentrically in its bottom. This socket 33 removably receives a key 35 which is toothed as at 36 so as to engage the teeth 29. A stud 37 is received in the socket 34 which provides a bearing for the key.

The invention is susceptible of various other changes in its form, proportions and minor details of construction and the right is herein reserved to make such changes as properly fall within the scope of the appended claims.

Having described the invention what is claimed is:—

1. In a compass, a housing provided with an annular circumferential groove, a magnetically controlled compass card, a curved indicator carrier, an indicator extending therefrom, a rib carried by said indicator carrier and disposed within the annular groove of the housing for mounting the carrier for circumferential movement, and finger pieces respectively formed integral with and at each end of the carrier and extending outwardly and upwardly from the face of the compass.

2. In a compass, a housing, a magnetically controlled compass card therein, a lens closing the top of the housing, a lens retaining annulus surrounding the outer edge of the lens and having a portion spaced therefrom to define an annular groove around the inner edge of the annulus, a curved arm, a rib extending around said arm within said groove to slidingly mount the arm, an indicator carried by the arm, said indicator being adapted to be positioned with respect to a point upon the compass card, and a finger piece extending from the arm.

In testimony whereof I affix my signature.

HARRY E. STAHL, Sr.